United States Patent [19]

Spease

[11] Patent Number: 4,841,806
[45] Date of Patent: Jun. 27, 1989

[54] SELF-ADJUST MINI INCREMENT

[75] Inventor: Arthur L. Spease, Livonia, Mich.

[73] Assignee: Teleflex Incorporated, Limerick, Pa.

[21] Appl. No.: 240,354

[22] Filed: Aug. 24, 1988

Related U.S. Application Data

[63] Continuation of Ser. No. 51,253, May 7, 1987, abandoned, which is a continuation of Ser. No. 775,681, Sep. 13, 1985, abandoned.

[51] Int. Cl.$^4$ ............................................. F16C 1/10
[52] U.S. Cl. ........................ 74/501.5 R; 74/502.6; 74/500.5; 74/501.6
[58] Field of Search ............ 74/500.5, 501.5 R, 501.6, 74/502, 502.4, 502.6, 503, 504; 188/196 B

[56] References Cited

U.S. PATENT DOCUMENTS

| | | | |
|---|---|---|---|
| 379,656 | 3/1888 | Parish | 74/502 |
| 1,841,513 | 1/1932 | Anderson | 188/196 B |
| 2,543,509 | 2/1951 | Sandberg | 74/503 |
| 2,584,521 | 2/1952 | Woodsworth | 74/503 |
| 2,621,537 | 12/1952 | Powell | 74/503 |
| 2,644,342 | 7/1953 | Roesch | 74/503 |
| 2,814,958 | 12/1957 | Powell et al. | 74/503 |
| 2,884,097 | 4/1959 | Stultz et al. | 188/196 B |
| 3,062,071 | 11/1962 | Morrow | 74/503 |
| 3,516,299 | 6/1970 | Conrad | 74/500.5 |
| 3,662,617 | 5/1972 | Bennett | 74/501 R |
| 3,710,645 | 1/1973 | Bennett | 74/501 P |
| 4,177,691 | 12/1979 | Fillmore | 74/501.5 R |
| 4,331,041 | 5/1982 | Bennett | 74/501 P X |
| 4,418,583 | 12/1983 | Taig | 74/501.5 R |
| 4,676,119 | 6/1987 | Spease | 74/501.5 R |

*Primary Examiner*—Gary L. Smith
*Assistant Examiner*—Vinh Luong
*Attorney, Agent, or Firm*—Reising, Ethington, Barnard, Perry & Milton

[57] ABSTRACT

The assembly includes a support member (22) adapted to be connected to a support structure (such as a bulkhead) and the conduit (12) includes a slider member (32) slidably disposed in a passageway (30) extending longitudinally through the support member (22). The slider member (32) also includes a plurality of locking teeth (58) spaced an equal distance apart longitudinally along the slider member (32). The support member (22) also includes a pair of guideways (36, 38) which support a pair of latch members (40, 42) for engagement with the locking teeth (58) and characterized by the latch members (40, 42) supported in guideways (36, 38) at increments less than the distance between adjacent teeth (58) on slider member (32) such that only one latch member is engaged with the teeth (58) at any one longitudinal position of the conduit.

22 Claims, 2 Drawing Sheets

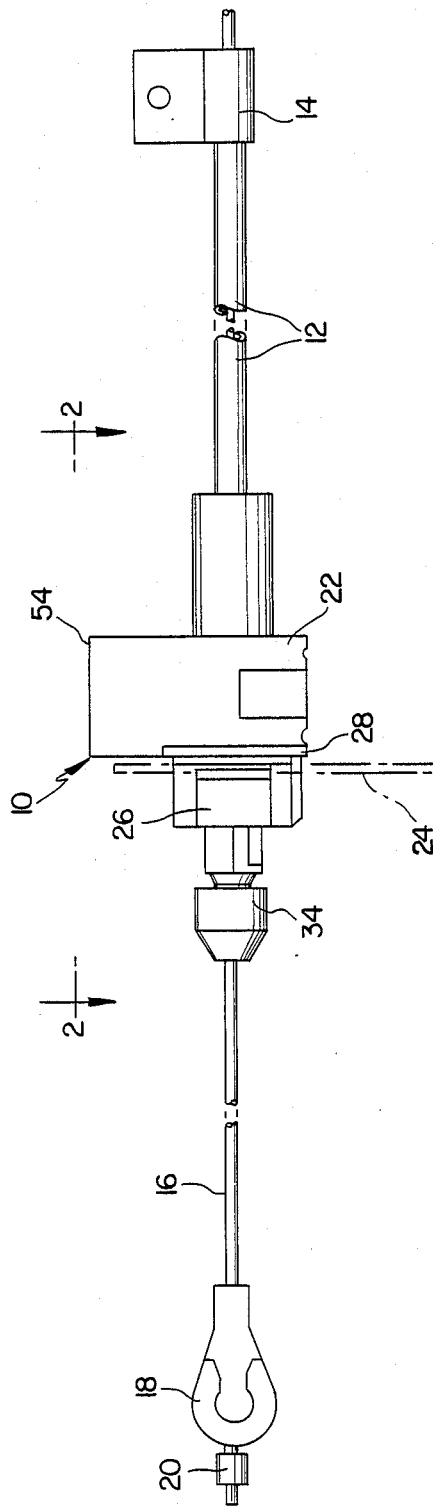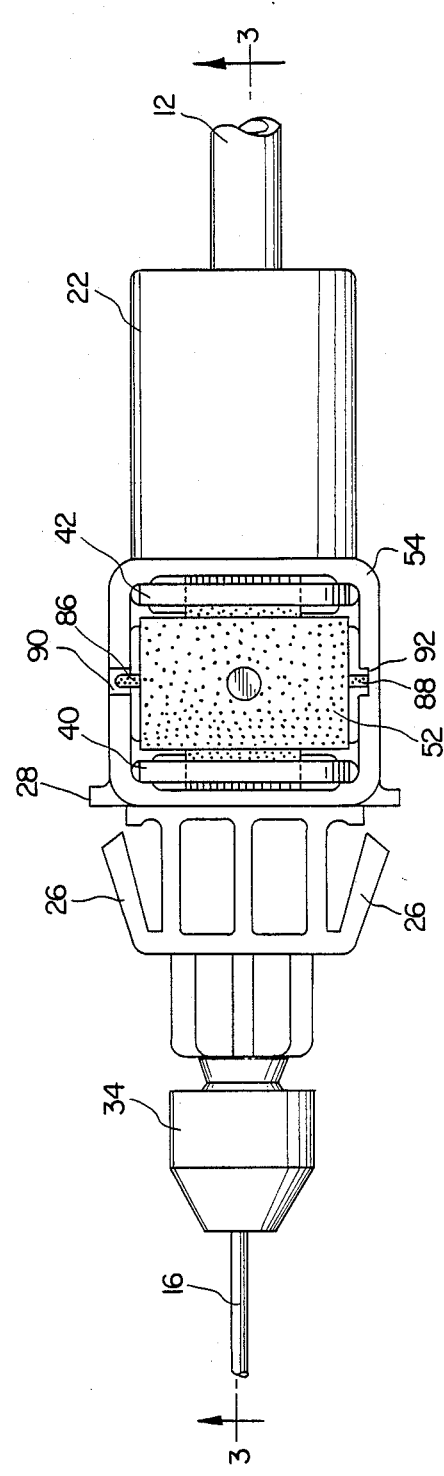

SELF-ADJUST MINI INCREMENT

This application is a continuation of application Ser. No. 051,253, filed 5-7-87 now abandoned which is a continuation of application Ser. No. 775,681, filed on 9-13-85, now abandoned.

BACKGROUND OF THE INVENTION

1. Field of Invention

The subject invention relates to a motion transmitting remote control assembly of the type wherein motion is transmitted in a curved path by a flexible motion-transmitting core element movably supported by a flexible conduit.

Such remote control assemblies normally include means adjacent each end of the conduit for attaching the conduit to a support structure with the core element extending from each end of the conduit. It is frequently desirable to adjust the length of the conduit to change the position at one end of the core element extending from the conduit once the assembly is installed. An example of such a situation is where a remote control assembly is utilized to interconnect the accelerator pedal and a throttle valve in automobiles. In this situation, the assembly is usually installed by attaching the conduit to the body of the automobile adjacent the accelerator pedal while attaching the end of the core element extending therefrom to the accelerator pedal. The opposite end of the conduit is attached to a support structure adjacent the carburetor so that the other or opposite end of the core element may be attached to the operating lever of the throttle valve. Frequently, however, the end of the core element adjacent the carburetor does not extend from the conduit a proper amount for attachment to the operating lever of the throttle valve. During such installation, the accelerator pedal is in its unmoved or idle position as is the operating lever of the throttle valve and if the end of the core element adjacent the operating lever of the throttle valve is not positioned correctly, the operating lever of the throttle valve must be moved for attachment of the core element so that the end result is that the accelerator pedal is in the idle position but the operating lever of the throttle valve is not. The position of the end of the core element extending from the conduit, i.e., the distance the core element extends from the conduit, may be changed by altering the length of the path over which the conduit extends.

2. Description of the Prior Art.

There are assemblies known in the prior art where an adjustment in the length of the conduit may be accomplished in order to change the distance the core element extends from the end of the conduit during an installation procedure. One type of such assemblies includes a support member adapted for attachment to a support structure with a slider member movably supported by the support member for longitudinal movement and connected to the end of the conduit whereby the conduit effectively changes in length as the slider member moves relative to the support member. The support member movably supports a locking or latching member which engages the slider member to control the longitudinal movement of the adjustment of the slider member relative to the support member. In order to provide for automatic adjustment of the length of a conduit, the slider member may ratchet relative to the latching member whereby once the assembly is installed, as in the environment described above, the accelerator pedal may be pushed to the full throttle position placing the core element in tension to place a longitudinal force on the conduit whereby the slider member ratchets relative to the support member to the proper adjusted position. Each increment of adjustment of the slider member is a function of the size of the ratcheting means, i.e., is governed by the size or longitudinal length of the teeth on the ratcheting means. Presently, problems sometimes arise because the increment of movement of the slider member is too great. However, reduction of the size of the ratcheting means or teeth would correspondingly reduce the strength of the locking teeth. The present invention solves the problem without reducing the size or strength of the locking teeth.

SUMMARY OF INVENTION

The subject invention relates to a motion—transmitting remote control assembly of the type for transmitting forces along a curved path by a motion transmitting core element movably supported within a flexible conduit with the ends of the core element extending from the ends of the conduit. The assembly includes a support member for supporting the conduit and locking means engageable with the conduit for controlling the longitudinal movement thereof relative to the support member. A conduit has a plurality of locking teeth spaced an equal distance apart longitudinally therealong. The assembly is characterized by the locking means supported by the support member and coacting with the teeth for locking the conduit against longitudinal movement at increments less than the distance between adjacent teeth.

PRIOR ART STATEMENT

The broad concept of accomplishing the automatic adjustment of the length of a conduit upon movement of the core element is illustrated in U.S. Pat. No. 3,662,617, granted May 16, 1972, in the name of William G. Bennett et al and U.S. Pat. No. 3,710,645, granted Jan. 16, 1973, in the name of William G. Bennett, both of which are assigned to the assignee of the subject invention. A more specific example of that concept is illustrated in U.S. Pat. No. 4,331,041, granted May 25, 1982, in the name of William G. Bennett and assigned to the assignee of the subject invention. The latter patent discloses a system wherein a motion-transmitting remote control assembly of the type for transmitting forces along a curved path by a motion-transmitting core element and includes a support member which incorporates a single locking means engageable with the conduit for controlling the longitudinal movement of the conduit relative to the support member. The locking means comprises a single latch member which engages the ratcheting teeth of the slider member via a tooth on an aperture in the latch member. The latch member is biased into engagement with the slider member by a spring which holds the latch member in engagement with the slider member to prevent a change in length of the conduit when the conduit has been adjusted to the proper length.

All of the above-described prior assemblies have proven to be very satisfactory and well suited for most environments; however, there is a need for a remote control assembly wherein the smallest increment of adjustment of the slider member is reduced without sacrificing the strength of the locking means.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side view of a preferred embodiment of the subject invention;

FIG. 2 is an enlarged top view taken substantially along line 2—2 of FIG. 1.

DESCRIPTION OF PREFERRED EMBODIMENT

Figure 3:
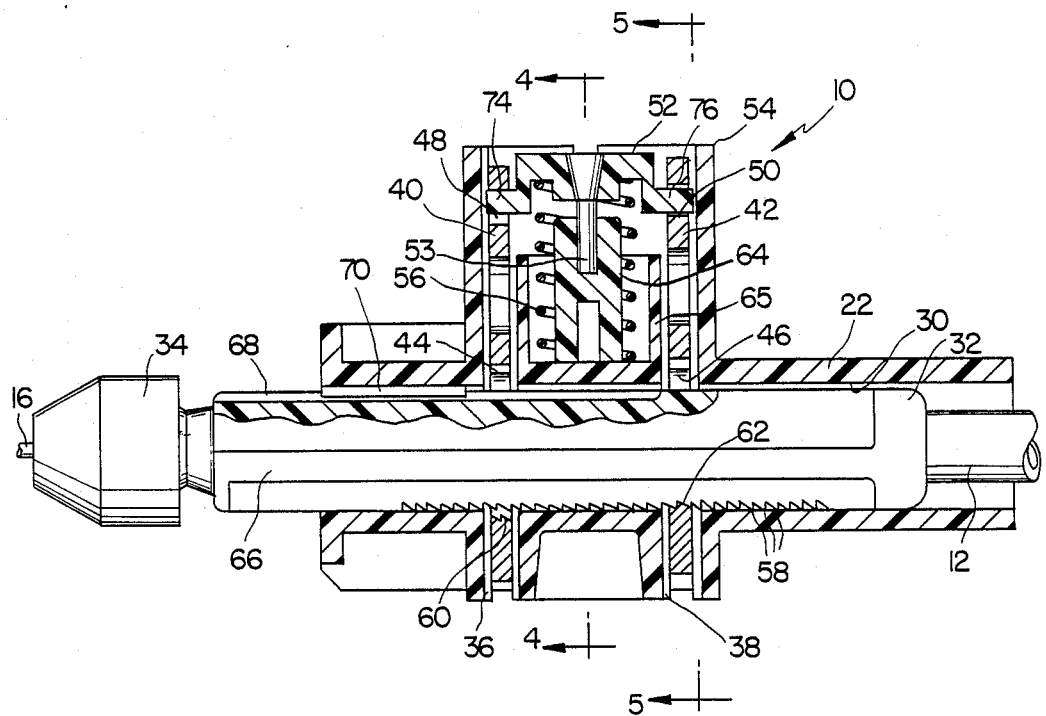
FIG. 3 is a cross-sectional view taken substantially along line 3—3 of FIG. 2.
Figure 4:
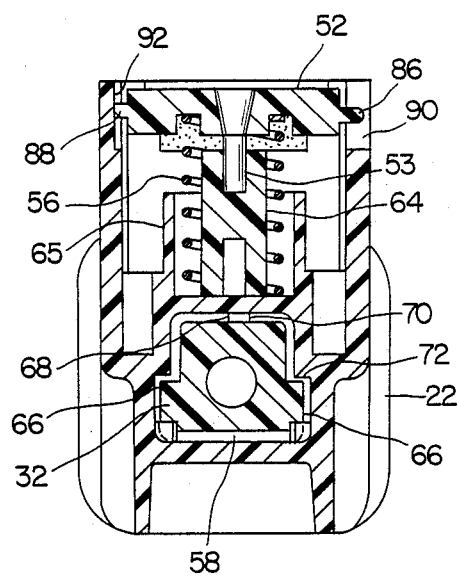
FIG. 4 is a cross-sectional view taken substantially along line 4—4 of FIG. 3.

A motion-transmitting remote control assembly constructed in accordance with the subject invention is generally shown at 10.

The assembly 10 includes a flexible conduit 12. The conduit 12 is preferably of the well known type including an inner tubular member made of organic polymeric material and surrounded by a plurality of long lay wires disposed helically thereabout with a casing of organic polymeric material disposed about the long lay wires and about the inner tubular member. A fitting 14 is attached to one end of the conduit 12 and is adapted by a flange with a hole therein for attaching the conduit to a support structure, such as the body of a vehicle.

A flexible motion-transmitting core element 16 is movably supported by the conduit 12 with the ends of the core element extending from the ends of the conduit. The motion-transmitting core element 16 is a wire member, as illustrated, but also may comprise metal strands helically wound together in cable-like fashion. A coupling member or terminal member 18 is disposed about the end of the core element for attachment of the core element to an operated or operating member. A slug 20 retains the terminal member 18 upon the core element. The opposite end of the core element 16 may include a similar terminal member as that shown at 18. The terminal member 18 is slidable along the core element 16 and includes a pocket for receiving the head of a pin, or the like, extending from an operated or operating member.

The assembly also includes a support member 22 adapted for attachment to a support structure such as the supporting bracket 24 shown in phantom in FIG. 1. The support member 22 is adapted for attachment to a support structure by snap-in means 26. The snap-in means 26 are inserted through an opening in a support member such as the bracket 24 to retain the support member 22 attached to the support bracket 24. Adjacent the snap-in means 26 is a flange 28 which forms a part of the support member 22. The snap-in means 26 may be of the type forming the subject matter of U.S. Pat. No. 3,427,894, granted to August E. Tschanz on Feb. 18, 1969, and assigned to the assignee of the subject invention.

The support member 22 includes a passageway 30 extending therethrough. Shoulders 72 project from support member 22 into passageway 30 and extend parallel to the longitudinal axis of the passageway 30. The conduit 12 includes a slider member 32 movably supported in the passageway 30. The slider member 32 is preferably of a rigid organic polymeric material molded about the plastic exterior of the conduit 12. The slider member 32 includes shoulders 66 on either side of the slider member 32 extending parallel to the longitudinal axis of the slider member 32. A groove 68 disposed centrally in the top portion of the slider member 32 extends parallel to the longitudinal axis of the slider member 32 and is engaged by guide means 70 extending downwardly from the support member 22 into passageway 30. The shoulders 66 and the groove 68 together with guide means 70, which is a tab, increase the stability of the remote control assembly. A swivelling dust cover and/or core wiper 34 is supported through a swivel socket on the end of the slider member 32.

The support member 22 also includes a pair of guideways 36 and 38 extending traversely to the passageway 30 and through the support member 22.

The assembly also includes alternately coacting locking means including a pair of latch members 40 and 42 alternately engageable with the slider member 32 of the conduit for alternately controlling the longitudinal movement of the conduit relative to the support member 22. More specifically, when one latch member is engaged with the slider member 32, the other latch member is disengaged. In addition, when either latch member 40 or 42 is engaged with slider member 32, shoulders 66 on slider member 32 abut shoulder 72 extending from the support member 22 into passageway 30 and provide a further support and stability to the assembly.

Figure 5:
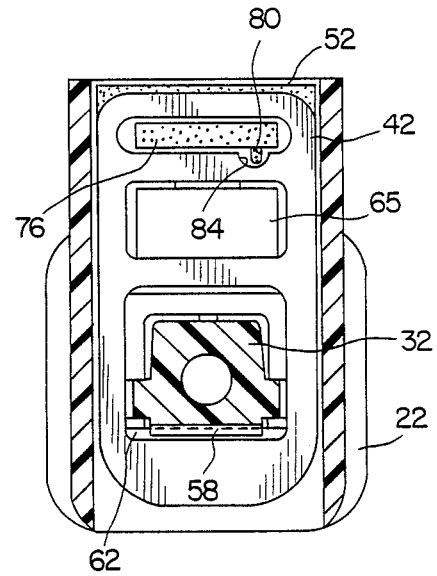
FIG. 5 is a cross-sectional view taken substantially along line 5—5 of FIG. 3.

The latch members 40 and 42 are movably supported in guideways 36 and 38 respectively and have apertures 44 and 46 respectively therethrough with the slider member 32 extending through the lower apertures 44 and 46 of latch members 40 and 42 respectively. The latch members 40 and 42 have upper apertures 48 and 50 respectively located at their upper ends. A rectangular cap member 52 includes lips 74 and 76 extending horizontally and outwardly from either sides of the cap member 52 along the longitudinal axis of the cap member 52. The cap member 52 is disposed within a protective wall 54 of the support member 22 and is biased upwardly by biasing means 56. The lips 74 and 76 extend through apertures 48 and 50 of latch members 40 and 42 respectively and include latch orientating means 80 which are tabs projecting downwardly from the underside of each lip 74 and 76 and which mate with notches 84 in latch members 40 and 42 respectively. The latch orientating means 80 of lip 76, which is shown in FIG. 5 mating with notch 84 of latch member 42, is also located on lip 74 and mates with notch 84 of latch member 40 but both the latch orientating means 80 and the notch 84 are located on the other side of the center line of FIG. 5. That is to say, the latch orientating means and notch of lip 74 and latch member 40 are asymmetrical with respect to the lip 76 and latch member 42 as shown in FIG. 5 and visa versa.

The cap member 52 also includes guide means 86 and 88 which are projections of unequal size and which extend outwardly and horizontally from either of the shorter sides of the rectangular cap member 52. The guide means 86 mates with slot 90 in the protective wall 54 and guide means 88 mates with notch 92 disposed opposite to slot 90 in protective wall 54. The aforementioned guide means aid in assembly of the subject invention as well as providing stability in use. The biasing means comprises a coil spring 56 reacting between the support member 22 and the cap member 52 for urging the cap member 52 into engagement with the latch members 40 and 42 which, in turn, alternately engage the slider member 32 of the conduit depending upon the position of the slider member. The cap member 52 is capable of pivotal movement with respect to the biasing means 56 such that one of either latch members 40 and 42 may be independently disengaged while the other one remains undisturbed. The biasing means 56 also allows the latch members 40 and 42 to be moved out of engagement with the slider member 32 in response to a predetermined force. The lower end of the spring 56 is disposed within a cavity in the support member 22 while the upper end engages the underside of the cap member 52.

Coacting ratcheting means comprising a plurality of locking teeth 58 on the slider member 32 and a single tooth 60 and 62 defined by the lower edge of apertures 44 and 46 on latch members 40 and 42 respectively are included for automatically allowing the conduit 12 to move longitudinally relative to the support member 22 in response to a predetermined longitudinal force applied to the conduit through the core element whereby the distance the core element extends from the conduit may be adjusted. The latch members 40, 42 are supported by the support member 22 a distance apart which is not a multiple of the distance between adjacent locking teeth 58 whereby only one of the latch members 40, 42 is in locking engagement with the teeth 58 at any given position. In this way, the conduit 12 may be locked against longitudinal movement at increments less than the distance between adjacent locking teeth 58. As explained above, in certain situations where tension is placed upon the core element 16, a force will be applied to the conduit when in a tortuous path urging the conduit to shorten in length between its supports and in such a situation the slider member 32 will ratchet forwardly to an adjusted position. Utilizing a plurality of latch members which independently and alternately engage the teeth 58 on the slider member 32, allows for a smaller, more precise increment of adjustment movement of the slider member 32 while maintaining the locking strength of the coacting ratcheting means. In addition, of course, the latch members 40 and 42 may be manually urged against the spring 56 to manually adjust the effective length of the conduit 12. Specifically, the teeth 58 on the slider member 32 and the single teeth 60 and 62 on latch members 40 and 42 respectively have a ratcheting configuration for allowing movement of the slider member 32 in one direction to the left, as illustrated in FIG. 3, relative to the support member 22 while engaged by one of the latch members either 40 or 42 but prevent such movement in the opposite direction while engaged by either latch member thereby effecting automatic ratcheting adjustment in the effective length of the conduit.

The assembly also includes a temperature-responsive means comprising an elongated slug 64 reacting between the support member 22 and the cap member 52 in parallel with the spring 56 for allowing movement of the latch members 40 and 42 in response to a predetermined force in a predetermined temperature range and for requiring higher forces to move the latch members 40 and 42 than the predetermined force at temperatures out of the predetermined temperature range. Cap member 52 reacts with slug 64 through pin 53 which extends from cap member 52 into slug 64. Spring 56 and slug 64 are disposed within and supported by a cup 65 of the support member 22. The operation of the slug 64 may be of the type forming the subject matter of U.S. Pat. No. 4,331,041 granted to William G. Bennett on May 25, 1982 and assigned to the assignee of the subject invention. Specifically, the slug 64 would allow normal operation of the latch members 40 and 42 in a normal ambient temperature range but would offer greater resistance to the movement of the latch member as temperatures fall below that temperature range. By way of example, the slug 64 may have no effect upon the latch members 40 and 42 in its coaction with the spring 56 during assembly at an automotive plant to obtain the desired adjusted length of the conduit. However, should the automobile be subjected to cold temperatures which increase the forces necessary to be transmitted by the core element 16, the slug would become more resistive to require a greater force to move the latch members 40 and 42 thereby preventing automatic or inadvertent adjustment in the length of the conduit to an undesired position.

The slug is made of a normally resilient organic polymeric material which increases in hardness with a decrease in temperature. As will be appreciated, the spring 56 and the slug 64 will be placed in compression upon disengaging movement of the latch members 40 and 42.

In one preferred embodiment the slug 64 was made of a polyacrylate having a durometer between 60 and 90.

All of the components except the core element 16 and the latch members 40 and 42 and the spring 56 are preferably made of organic polymeric or plastic materials.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly of the type for transmitting forces along a curved path by a motion transmitting core element, said assembly comprising a flexible conduit (12) having opposite ends, a flexible motion transmitting core element (16) movably supported by said conduit (12), a support member (22) for supporting said conduit (12), locking means (40,42) engageable with said conduit (12) for controlling the longitudinal movement thereof relative to said support member (22), said conduit (12) having a plurality of locking teeth (58) spaced an equal distance apart longitudinally therealong, said locking means (40,42) supported by said support member (22) and coacting with said locking teeth (58) for locking said conduit (12) against longitudinal movement at increments less than the distance between adjacent locking teeth (58) as said core element is movable within said conduit, said locking means including latch members (40,42) for independently engaging said locking teeth (58) and being supported by said support means (22) a distance apart which is not a multiple of said distance between adjacent locking teeth (58) whereby only one of said latch members (40,42) is in locking engagement with said teeth (58) at an given position for establishing said increments of adjustment less than said distance between adjacent locking teeth (58), said locking means including biasing means (56) for urging said latch members (40,42) into engagement with said teeth (56), said latch members (40,42) being plates having apertures (44,46,48,50) at first and second ends therethrough with said conduit (12) extending through said apertures (44,46) at said first end and a cap member (52) including peripheral lips (74,76) extending through the apertures (48,50) at said second end.

2. An assembly as set forth in claim 1 further characterized by said lips (74, 76) including latch orientating means (80) for mating with notches (84) in said latch members (40, 42).

3. An assembly as set forth in claim 2 further characterized by said cap member (52) being urged into engagement with said latch members (40, 42) by said biasing means (56) and said cap member (52) capable of pivotal movement with respect to said biasing means (56) such that one of said latch members (40, 42) may be independently disengaged while the other one remains undisturbed.

4. An assembly as set forth in claim 3 wherein said latch orientating means are tabs (80) which project downwardly from the underside of each lip (74, 76).

5. An assembly as set forth in claim 4 wherein said support member (22) includes a passageway (30) extending therethrough, a plurality of guideways (36. 38) extending traversely to said passageway (30) and said latch members (40, 42) movably supported in said guideways (36, 38).

6. An assembly as set forth in claim 5 wherein said cap member (52) is rectangular and includes guide means (86, 88) for providing stability.

7. An assembly as set forth in claim 6 further characterized by said conduit (12) including a slider member (32) slidably supported in said passageway (30) and said slider member (32) having said plurality of said locking teeth (58).

8. An assembly as set forth in claim 7 wherein said guide means are projections (86, 88) which extend into a slot (90) on one side of said support structure and into a notch (92) on the other side of said support member (22).

9. An assembly as set forth in claim 8 further characterized by said locking teeth (58) on said slider member (32) and said latch members (40, 42) having a ratcheting configuration for allowing movement of said slider member (32) in one direction relative to said support member (22) while engaged by said latch members (40, 42) and preventing such movement in the opposite direction while engaged by said latch members (40. 42).

10. An assembly as set forth in claim 9 whereby said projections (86, 88) are of unequal size and which extend outwardly and horizontally from either of the shorter sides of said rectangular cap member (58).

11. An assembly as set forth in claim 10 further characterized by a temperature-responsive means (64) reacting between said support member (22) and said latch members (40, 42) in parallel with said biasing means (56) for allowing movement of said latch members (40, 42) in response to said predetermined force in a predetermined temperature range and for requiring higher forces than said predetermined force at temperatures out of said predetermined temperature range.

12. An assembly as set forth in claim 11 wherein said biasing means comprises a coil spring (56) and said temperature-responsive means comprises an elongated slug (64), said spring (56) and said slug (64) engaging said cap member (52) and reacting between said support member (22) and said cap member (56).

13. A motion transmitting remote control assembly of the type for transmitting forces along a curved path by a motion transmitting core element, said assembly comprising a flexible conduit (12) having opposite ends, a flexible motion transmitting core element (16) moveably supported by said conduit (12), a support member (22) for supporting said conduit (12), locking means (40,42) engageable with said conduit (12) for controlling the longitudinal movement thereof relative to said support member (22), said conduit (12) having a plurality of locking teeth (58) longitudinally therealong, said locking means including at least two latching members (40,42) supported by said support member (22) and coacting with said locking teeth (58) for independently engaging said locking teeth (58), and a cap member (52) moveable relative to said support member (22) and operatively connected to said latch members (40,42), biasing means (56) reacting between said support member (22) and said cap member (52) for urging said latch members (40,42) into engagement with said teeth (56), said cap member (52) being movable relative to said support member (22) and against said biasing means (56) to disengage one or both of said latch members (40, 42) from said teeth (58) to allow said conduit (12) to move longitudinally.

14. An assembly as set forth in claim 13 further characterized by said latch members (40,42) being plates having apertures (44,46,48,50) at first and second ends therethrough with said conduit (12) extending through said apertures (44,46) at said first end.

15. An assembly as set forth in claim 14 further characterized by said cap member (52) including peripheral lips (74,76) extending through the apertures (48,50) at second end of said latch members (40,42) to disengage one or both of said latch members (40,42) from said teeth (58) to move said conduit (12) longitudinally.

16. An assembly as set forth in claim 15 further characterized by said lips (74, 76) including latch orientating means (80) for mating with notches (84) in said latch members (40,42).

17. An assembly as set forth in claim 16 further characterized by said cap member (52) being urged into engagement with said latch members (40,42) by said biasing means (56) and said cap member (52) capable of pivotal movement with respect to said biasing means (56) such that one of said latch members (40,42) may be independently disengaged while the other one remains undisturbed.

18. An assembly as set forth in claim 17 further characterized by said latch orientating means being tabs (80) which project downwardly from the underside of each lip (74,76).

19. An assembly as set forth in claim 18 further characterized by said support member (22) including a passage way (30) extending therethrough, a plurality of guideways (36,38) extending tranversely to said passage way (30) and said latch member (40,42) moveably supported in said guideways (36,38).

20. An assembly as set forth in claim 19 further characterized by said cap member (52) being rectangular and including guide means (86,88) for providing stability.

21. An assembly as set forth in claim 20 further characterized by said guide means being projections (86,88) which extend into a slot (90) on one side of said support structure and into a notch (92) on the other side of said support member (22).

22. An assembly as set forth in claim 21 further characterized by said projections (86,88) being of unequal sides and which extend outwardly and horizontally from either of the shortest sides of said rectangular cap member (52).

* * * * *